Sept. 15, 1931.  I. H. KENDALL  1,823,549
SANITARY FITTING
Filed Jan. 24, 1928
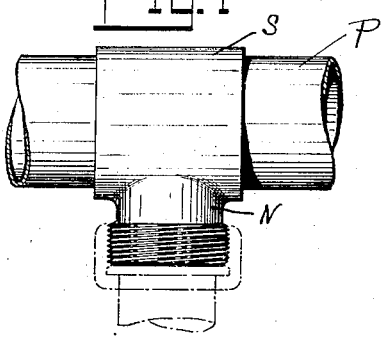
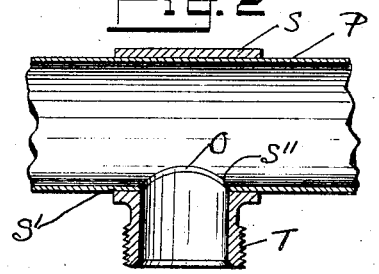
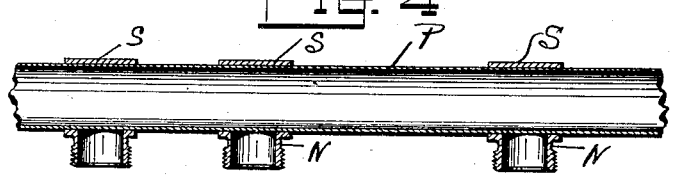
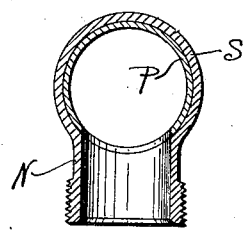
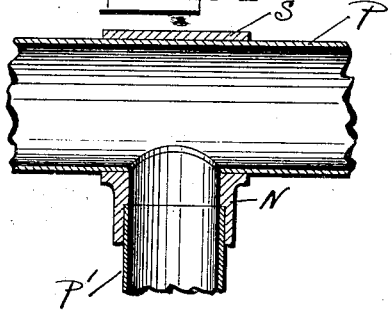
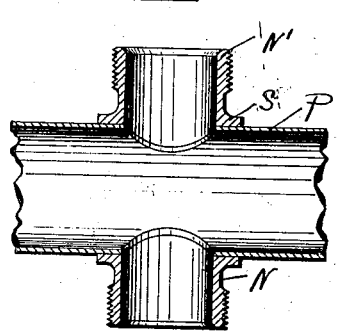
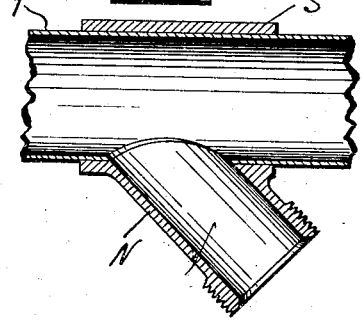
INVENTOR
Ira H Kendall
BY
ATTORNEYS Patented Sept. 15, 1931

1,823,549

UNITED STATES PATENT OFFICE

IRA H. KENDALL, OF POTSDAM, NEW YORK, ASSIGNOR TO THE KENDALL PATENTS, INC., OF POTSDAM, NEW YORK, A CORPORATION OF NEW YORK

SANITARY FITTING

Application filed January 24, 1928. Serial No. 249,173.

My invention relates to a new and improved sanitary fitting.

One of the objects of my invention is to provide a new and improved sanitary fitting which shall be especially useful for use in connection with devices for treating milk.

Another object of my invention is to provide a sanitary coupling which shall be especially useful in connection with heating and cooling devices through which milk is caused to flow in a line of piping.

Other objects of my invention will be set forth in the following description and drawings which illustrate a preferred embodiment thereof, it being understood that the above general statement of the objects of my invention is intended merely to generally explain the same, and not to limit it in any manner.

Fig. 1 is an elevation showing one embodiment of my invention.

Fig. 2 is a longitudinal sectional view of the device shown in Fig. 1.

Fig. 3 is a transverse sectional view of the device shown in Fig. 1.

Fig. 4 is a central sectional view showing how a plurality of couplings are applied to a single pipe.

Fig. 5 is a longitudinal sectional view showing how a double T coupling is applied.

Fig. 6 is a longitudinal sectional view showing a different form of coupling.

Fig. 7 is a longitudinal sectional view showing a Y type of coupling.

Heretofore in making couplings for the piping in devices for treating milk, it has been necessary to make the parts with tightly fitting shoulders and to connect said parts very tightly so that a film of milk would not accumulate in the joints of the coupling. If a film of milk were permitted to accumulate in joints of the coupling, this speedily affected the taste of the milk passing through the piping in an objectionable manner.

According to my invention, the coupling can be very rapidly applied in a perfectly sanitary manner to any part of a pipe line, so that there is great saving in time and labor cost.

As shown in Figs. 1–3 inclusive, the coupling comprises a sleeve S which fits snugly over the pipe P. The sleeve S is provided with an open end or neck N, the end of which may have a threading T. The sleeve S can be slid into position on the pipe P to any desired point, and while it is held in said position, an opening O can be readily formed in the wall of the pipe P. The sleeve S can be held in position by a film of solder at the lines S' and S''. The film of solder along the line S'' renders the device perfectly sanitary because no milk can accumulate in any part of the coupling. Since the sleeve S fits snugly upon the pipe P, this film of solder along the lines S' and S'' may be very thin, and by choosing a proper solder the taste of the milk is not objectionably affected.

As shown in Fig. 4, the sleeves S may be respectively slid to the desired points at which couplings must be connected to a long pipe P and the connection openings between the sleeve S and the pipe P may then be formed as above described.

As shown in Fig. 5, the sleeve S may have two openings or necks N and N'.

As shown in Fig. 6, the sleeve S can be provided with a neck having a shoulder formed in the inner wall thereof, so that the branch pipe P' can be suitably connected to the neck N.

As shown in Fig. 7, the neck N can be inclined to the sleeve S and to the pipe P. For example, I prefer to connect the coupling to the pipe before forming the opening or openings O which connect the pipe to the coupling. However, it would not be departing from the spirit of my invention to first form the opening or openings O and to then secure the couplings into their proper position or positions.

I have shown a preferred embodiment of my invention, but it is clear that numerous changes and omissions could be made without departing from its spirit.

I claim:—

1. A method of forming a sanitary coupling for milk-treating devices which consists in forming an opening in the wall of a pipe intermediate the ends of said pipe and at a point corresponding to the point of connection between said pipe and the coupling, placing upon said pipe a tightly fitting unitary coupling sleeve having a neck which communicates with the said opening, and then connecting the interior of said coupling to the said pipe by a metallic seal.

2. A method of forming a sanitary coupling for milk-treating devices which consists in forming an opening in the wall of a pipe intermediate the ends of said pipe and at a point corresponding to the point of connection between said pipe and the coupling, placing upon said pipe a coupling sleeve having a neck which communicates with the said opening, and then connecting the said coupling to the said pipe by a sealing film of solder along the line of connection between the outer edge of the said opening and the inner wall of the said neck, to prevent the entry of milk between the outer wall of said pipe and the inner wall of said sleeve.

3. A sanitary coupling for a milk-treating device comprising a pipe, a tightly fitting unitary coupling sleeve fitting over the said pipe intermediate the ends of said pipe, said coupling sleeve having an open neck projecting therefrom, said pipe having an opening formed in the wall thereof which is aligned with the inner end of the said neck, said sleeve being secured to said pipe so that said opening remains in alignment with said neck, the inner edge of said neck being connected to the edge of said opening to form a metallic seal.

4. A sanitary coupling for a milk-treating device comprising a pipe, a coupling sleeve fitting over the said pipe, said coupling sleeve having an open neck projecting therefrom, said pipe having an opening formed in the wall thereof which is aligned with the inner end of the said neck, said sleeve being secured to said pipe so that said opening remains in alignment with said neck, said opening being secured to said sleeve by a film of solder at the line of junction between the outer edge of the said opening and the inner edge of said neck.

In testimony whereof I affix my signature.

IRA H. KENDALL.